No. 653,834. Patented July 17, 1900.
A. G. WINSLOW.
CHURN.
(Application filed Jan. 23, 1900.)
(No Model.)
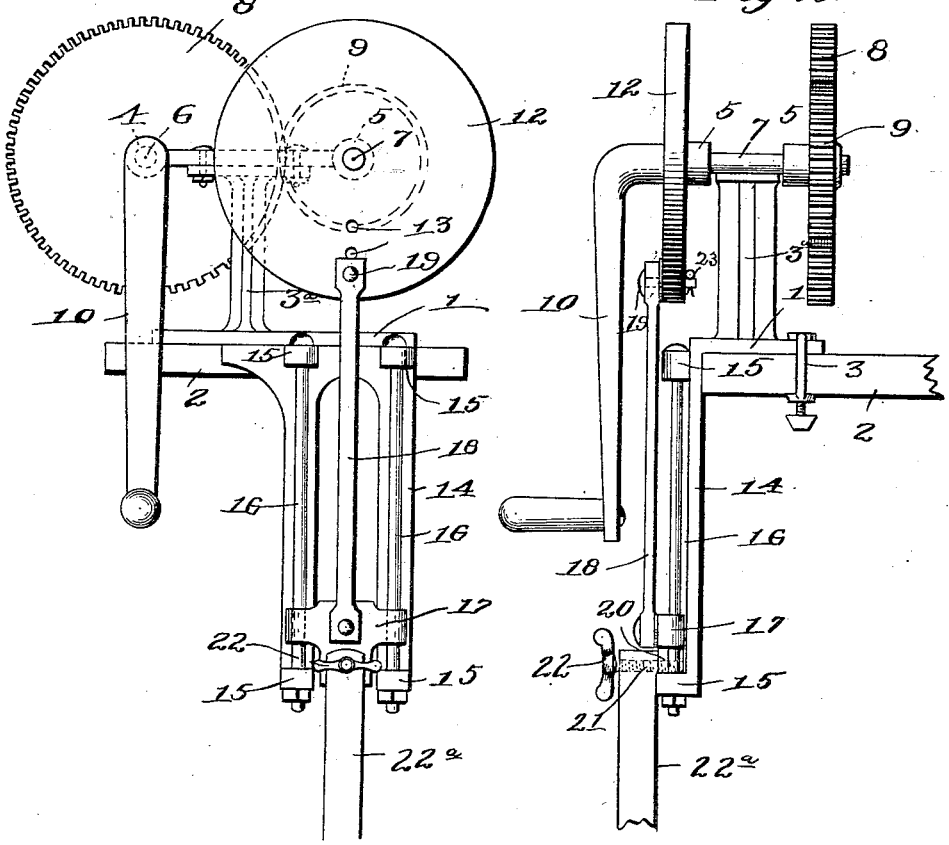
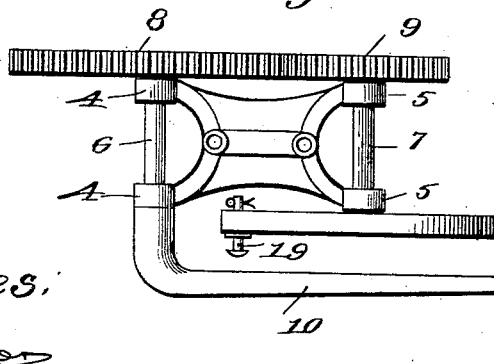
Witnesses:
Inventor
Alsar G. Winslow
By James L. Norris
Atty

UNITED STATES PATENT OFFICE.

ALSON G. WINSLOW, OF MEMPHIS, TENNESSEE.

CHURN.

SPECIFICATION forming part of Letters Patent No. 653,834, dated July 17, 1900.

Application filed January 23, 1900. Serial No. 2,527. (No model.)

*To all whom it may concern:*

Be it known that I, ALSON G. WINSLOW, a citizen of the United States, residing at Memphis, in the county of Shelby and State of Tennessee, have invented new and useful Improvements in Attachments for Operating Churns, of which the following is a specification.

My invention relates to attachments for operating churns. It is my purpose to provide an attachment consisting of a cast-metal frame having a bed-plate capable of being secured by an ordinary clamp upon any table or shelf and provided with a downward extension upon which is a cross-head of special construction to which the dasher-staff is secured, simple means being provided whereby the length of the stroke may be varied to suit the depth of milk in the churn or other conditions.

My invention also consists in certain novel features of construction and new combinations of parts, all of which will be fully described hereinafter, and then particularly pointed out and defined in the claim which follows this specification.

For the purposes of this description reference is had to the accompanying drawings, in which—

Figure 1 is a front elevation of the attachment secured to an ordinary shelf or table in readiness for operation. Fig. 2 is a side elevation of the same. Fig. 3 is a plan view, the churn-dasher being detached.

The reference-numeral 1 in said drawings indicates a bed-plate, which is adapted to rest upon a table, shelf, or any horizontal support, (indicated in the drawings by the numeral 2,) a clamp 3 of any ordinary construction being used to fasten it.

From the bed-plate 1 rises a rigid post $3^a$, which supports two bearings 4 and 5, in which are arranged horizontal and parallel shafts 6 and 7. Upon the shaft 6 is a large spur-gear 8, meshing with a smaller gear 9 upon the shaft 7. The shaft 6 is also provided with a suitable crank 10. On the shaft 7 is a disk 12, of sufficiently-large diameter, provided with a series of openings 13, arranged in a radial line at suitable distances from each other between the axis and the periphery of the disk.

From the edge of the bed-plate 1 drops an extension 14, integral with the bed-plate and provided with four lugs 15, two at or near the upper and two at the lower end. These lugs support guide-rods 16, upon which a cross-head 17 is movable, its motion being produced by a pitman 18, having one end pivotally connected to the upper end of the cross-head and its other end connected to the disk 12 by a pivot-pin 19, which engages one of the series of openings 13 in the disk. In the lower end of the cross-head 17 is an opening 20 to receive a pin 21, having a removable winged nut 22 upon its outer threaded end. The dasher-staff $22^a$ of the churn is attached to the cross-head by means of this pin.

The shafts 6 and 7 are parallel and horizontal, the latter being in the same vertical line with the dasher-staff. The crank 10 and disk 12 are both upon the outer or front ends of said shafts. The crank being of such length as to extend beyond the periphery of the disk, the squared end of the shaft is extended sufficiently to enable it to clear said disks as it turns, as shown in Figs. 2 and 3.

The diameters of the two gears 8 and 9 are relatively such as to give a suitable speed of reciprocation to the dasher-staff by a moderate revolution of the larger gear 8.

The depth of stroke of the churn-dasher, as well as the length of said stroke, may be varied to suit the quantity of milk in the churn by merely connecting the end of the pitman at different points between the periphery of the disk 12 and its axis. This is done by removing the pivot-pin 19 from one of the openings 13 in the disk and inserting it in another. The pin is fastened in place by a cotter 23, which is easily removable and is provided with two collars 24, between which the end of the pitman 18 lies.

The construction shown and described provides a light, compact, simple, and inexpensive mechanism for operating churn-dashers capable of use with any form of reciprocating dasher. The bed-plate 1 can be attached to any preferred support—such as a table, shelf, or bracket—to which it is secured by one or more clamps of any ordinary form. Any preferred power may of course be used to drive the mechanism in place of the crank shown.

Having thus described my invention, what I claim as new, and desire to secure by Letters Patent of the United States, is—

The herein-described mechanism for operating a churn-dasher, consisting of a horizontal bed-plate adapted to be removably attached to a suitable support and provided with a standard formed integral with and rising from the bed-plate at a right angle thereto, an integral extension depending from the front of the bed-plate at a right angle thereto and provided on its face with two pairs of oppositely-disposed apertured lugs, a pair of parallel guide-rods supported by said lugs, two parallel shafts arranged in the same horizontal plane and journaled in bearings carried by the said standard, intermeshing gears fixed to the rear ends of said shafts, a disk fixed to the forward end of the shaft located above the guide-rods, a crank on the forward end of the opposite shaft, a cross-head freely movable on the guide-rods, a pitman loosely connecting said disk and cross-head, and means for attaching a dasher-staff to the cross-head, substantially as described.

In testimony whereof I have hereunto set my hand in presence of two subscribing witnesses.

ALSON G. WINSLOW.

Witnesses:
L. E. ROYSTER,
E. C. LITTY.